(12) United States Patent
Babu et al.

(10) Patent No.: US 12,056,991 B1
(45) Date of Patent: Aug. 6, 2024

(54) CONTACTLESS USER AUTHENTICATION AND AUTHORIZATION

(71) Applicant: WELLS FARGO BANK, N.A., San Francisco, CA (US)

(72) Inventors: Ramesh Babu, Bangalore (IN); Naveen Gururaja Yeri, Bangalore (IN); Ashutosh Verma, Bangalore (IN); Shitiz Gupta, Bangalore (IN); Divakar Vijayan, Bangalore (IN); Manpreet Singh, Hyderabad (IN); Vinothkumar Venkataraman, Bangalore (IN); Nihar Swain, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 129 days.

(21) Appl. No.: 17/707,500

(22) Filed: Mar. 29, 2022

(51) Int. Cl.
G06Q 20/10 (2012.01)
G06Q 20/32 (2012.01)
G07F 19/00 (2006.01)

(52) U.S. Cl.
CPC ....... *G07F 19/206* (2013.01); *G06Q 20/1085* (2013.01); *G06Q 20/3278* (2013.01); *G07F 19/202* (2013.01); *G07F 19/203* (2013.01); *G07F 19/207* (2013.01); *G07F 19/209* (2013.01)

(58) Field of Classification Search
CPC .... G07F 19/206; G07F 19/202; G07F 19/203; G07F 19/207; G07F 19/209
USPC ...................................... 705/35–45
See application file for complete search history.

(56) References Cited

U.S. PATENT DOCUMENTS

| | | | |
|---|---|---|---|
| 7,606,560 | B2 | 10/2009 | Labrou et al. |
| 8,972,297 | B2 | 3/2015 | Kay et al. |
| 10,475,015 | B2 | 11/2019 | Black |
| 10,963,851 | B2 | 3/2021 | Block |
| 10,984,419 | B2 | 4/2021 | Ruparelia et al. |
| 11,074,561 | B2 | 7/2021 | Cady et al. |
| 2004/0049455 | A1* | 3/2004 | Mohsenzadeh ........ G06Q 20/00 705/40 |
| 2011/0238573 | A1 | 9/2011 | Varadarajan |
| 2013/0046689 | A1* | 2/2013 | Sundberg ............... G06Q 40/02 705/42 |

(Continued)

OTHER PUBLICATIONS

Mahansaria et al., "Secure Authentication for ATM transactions using NFC technology", 2019 International Carnahan Conference on Security Technology (ICCST), Oct. 2019, pp. 1-5, IEEE.

(Continued)

*Primary Examiner* — Robert R Niquette
(74) *Attorney, Agent, or Firm* — Kilpatrick Townsend & Stockton LLP (57) ABSTRACT

An automated teller machine ("ATM") receives, from a user computing device via a first wireless communication session, a unique transaction identifier ("UTN"). The ATM transmits the UTN to a bank computing system via a network. The ATM receives, from the bank computing system responsive to transmitting the UTN, transaction details and a first security code associated with the UTN. The ATM receives, from the user computing device via a second wireless communication session, a second security code. Responsive to determining that the first security code matches the second security code, the ATM processes a transaction in accordance with the transaction details.

14 Claims, 5 Drawing Sheets

(56) References Cited

U.S. PATENT DOCUMENTS

| | | | |
|---|---|---|---|
| 2013/0238497 A1 | 9/2013 | Ramachandran et al. | |
| 2013/0282581 A1* | 10/2013 | Singh | G06Q 20/322 |
| | | | 705/44 |
| 2014/0019353 A1* | 1/2014 | Henderson | G07F 19/203 |
| | | | 705/42 |
| 2015/0193765 A1* | 7/2015 | Gadotti | G06Q 20/3278 |
| | | | 705/39 |
| 2015/0287017 A1 | 10/2015 | Iqbal et al. | |
| 2015/0339668 A1* | 11/2015 | Wilson | G06Q 20/40 |
| | | | 705/41 |
| 2016/0012415 A1* | 1/2016 | Surya | G06Q 20/322 |
| | | | 705/39 |
| 2016/0086143 A1* | 3/2016 | Hao | G06Q 20/4097 |
| | | | 705/43 |
| 2016/0189157 A1* | 6/2016 | Bavirisetty | G06Q 20/4012 |
| | | | 705/44 |
| 2018/0005206 A1* | 1/2018 | Belin | G06Q 20/1085 |
| 2018/0165663 A1 | 6/2018 | Naik et al. | |

OTHER PUBLICATIONS

Munadi et al., "Security System ATM Machine with One-Time Passcode on M-Banking Application", 2019 International Conference on Mechatronics, Robotics and Systems Engineering (MoRSE), Dec. 2019, IEEE.

* cited by examiner

CONTACTLESS USER AUTHENTICATION AND AUTHORIZATION

TECHNICAL FIELD

This disclosure generally relates to automated teller machine ("ATM") transactions. More specifically, but not by way of limitation, this disclosure relates to systems for authorizing ATM transactions and authenticating users in ATM transactions.

BACKGROUND

Conventional approaches for authenticating a user at an ATM generally involve receiving, from the user, a personal identification number (PIN) or other information manually input via the ATM. Further, conventional approaches for conducting a transaction at an ATM involve the user physically contacting the ATM to input transaction details. For example, users may swipe a bank card to a reader of the ATM or otherwise input account data to the ATM and then press buttons of the ATM, touch user interface objects on a display screen of the ATM, or otherwise manually interact with the ATM to input user credentials or transaction details (e.g. an account number and an amount of physical cash to withdraw via the ATM).

SUMMARY

The present disclosure describes techniques for enabling user authentication for a contactless ATM transaction. For example, an ATM receives, from a user computing device via a first wireless communication session, a unique transaction identifier ("UTN"). The ATM transmits the UTN to a bank computing system via a network. The ATM receives, from the bank computing system responsive to transmitting the UTN, transaction details and a first security code associated with the UTN. The ATM receives, from the user computing device via a second wireless communication session, a second security code. Responsive to determining that the first security code matches the second security code, the ATM processes a transaction in accordance with the transaction details.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a system to schedule and enable user authentication for a contactless ATM transaction. Certain embodiments described herein improve the performance of conventional ATM transaction systems by, for example, issuing a unique transaction number associated with a scheduled transaction with preconfigured transaction details to enable users to conduct contactless ATM transactions. Further, certain embodiments described herein improve the security of conventional ATM transaction systems by, for example, issuing a security code associated with scheduled ATM transactions to user computing devices for authentication of users conducting contactless ATM transactions.

The following non-limiting example is provided to introduce certain embodiments. In this example, a bank system receives, from a user computing device (e.g. a mobile device, a tablet device, or other user computing device), a request for a unique transaction number ("UTN") and transaction details for an anticipated transaction. The anticipated transaction may be a cash withdrawal or other transaction from an ATM associated with the bank system. In some examples, the bank system is a bank and the user computing device is associated with a customer of the bank. The user computing device may include a banking application which communicates with the bank system via a network. For example, the user of the user computing device may access a website of the bank system and download the banking application via the network. The banking application may be associated with an account of the user at the bank. In some examples, the user computing device transmits, via the banking application, or via a website of the bank system, the request for the UTN responsive to receiving inputs of the user via a user interface of the user computing device. For example, the user may input the transaction details via the user interface using the banking application operating on the user computing device. Transaction details could include a transaction amount, a selected account of the user with the bank system, an anticipated time of the ATM transaction, an expiration time for the transaction, a particular ATM for the transaction, or other relevant transaction information. For example, the user requests a cash withdrawal of five hundred dollars from the user's checking account at 3:00 p.m. Eastern time at a particular ATM near the user's current location.

The bank system generates a UTN for the anticipated transaction. In certain examples, the UTN is selected from a predefined list of sequential numbers. In other examples, the bank system uses a random number generator to generate the UTN. In some instances, the UTN is a sequence of one or more of numbers, letters, symbols, and/or other characters. In certain examples, the bank system associates a time stamp with the UTN that specifies a time of expiration for the UTN. For example, the UTN is valid for a predefined amount of time (e.g. 2 hours, 4 hours, or other predefined period of time) from the current time, or is valid for a predefined amount of time (e.g. 2 hours, 4 hours, or other predefined period of time) past the anticipated time of the ATM transaction as specified in the transaction details. In other examples, the time of expiration for the UTN is specified in the transaction details received from the user computing device. In certain examples, the bank system associates the UTN with a particular ATM (e.g. associated with an ATM device identifier) specified in the transaction details. The bank system may associate the UTN with the transaction details received from the user computing device and store the UTN in a database accessible to the bank system along with the associated transaction details and any other information associated with the UTN (e.g. an ATM device identifier, an expiration time stamp for the UTN, etc.). In some embodiments, the bank system then generates a security code associated with the UTN. The bank system may generate the security code using a random number generator. In some instances, the security code is a sequence of one or more of numbers, letters, symbols, or other characters. The bank system stores the security code along with the UTN in the database accessible to the bank system. The bank system transmits the UTN and the security code to the user computing device in response to the request for the UTN.

The bank system receives, from an ATM, the UTN, wherein the ATM received the UTN from the user computing device. For example, the user approaches the ATM and requests a transaction. In some instances, the user activates the ATM using a voice command (e.g. "I need to withdraw cash!") and the ATM detects the voice command and displays a request for the user to open the banking application on the user computing device, select a scheduled transaction, and tap the user computing device to an reader device of the ATM. The reader device may be configured to establish a near-field communication ("NFC") communication channel with the user computing device responsive to detecting the user computing device. In response to the user tapping the user computing device (e.g. moving the user computing device to within a predefined proximity to the reader device of the ATM such that a communication channel can be established), the reader device of the ATM and the user computing device establish the NFC communication channel. The user computing device transmits the UTN to the ATM via the NFC communication channel. The ATM transmits the received UTN to the bank system via the network. In some instances, the ATM transmits its unique identifier (e.g. a hardware identifier or other device identifier) along with the UTN.

The bank system determines whether the UTN is valid. If the UTN is not valid, the transaction is canceled. In some instances, the bank system determines that the UTN is not valid because a current time is later than a time indicated on an expiration time stamp associated the UTN. In some instances, the bank system determines that the UTN is invalid because it is received from an ATM that is different than the ATM specified in the transaction details. If the UTN is valid, the bank system transmits a security code to the ATM. The ATM compares the security code received from the bank system with a security code received from the user computing device during the ATM transaction. For example, responsive to receiving the security code from the bank system, the ATM transmits a request to the user computing device, via the NFC communication channel, for a security code and receives, from the user computing device, the security code and compares the security code received from the user computing device to the security code received from the bank computing device. In certain examples, the ATM successively receives the UTN and the security code from the user computing device via an NFC communication channel established via a single tap of the user computing device. In other examples, the ATM receives the UTN from the user computing device via a NFC communication channel established via a first tap of the user computing device and subsequently receives the security code from the user computing device via a subsequent NFC communication channel established via a second tap of the user computing device. In these other examples, the ATM, responsive to receiving the security code from the bank computing device, displays a request for the user to conduct a second tap of the user computing device and establishes the subsequent NFC communication channel to receive the security code from the user computing device responsive to detecting the user computing device in the second tap.

The ATM processes the transaction. For example, in response to determining that the security code received from the bank system associated with the UTN matches the security code received from the user computing device, the ATM processes the transaction. For example, the ATM processes the ATM transaction according to parameters defined in the transaction details associated with the UTN. For example, the UTN specifies a cash withdrawal from the user's checking account of five hundred dollars and processing the transaction involves removing five hundred dollars from the user's checking account and dispensing five hundred dollars in physical currency (e.g., cash) to the user.

Figure 1:
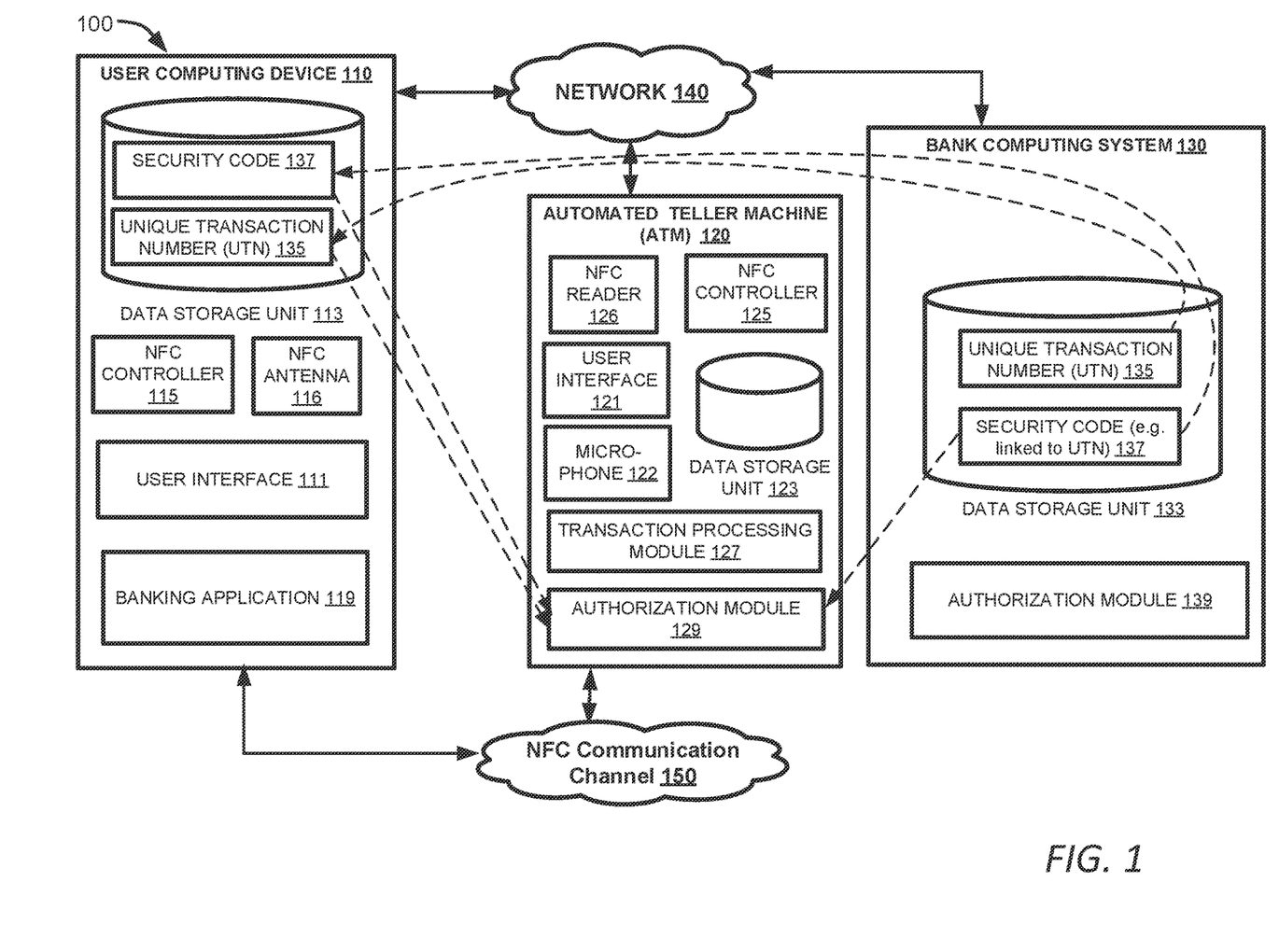
FIG. 1 depicts an example of a computing environment for scheduling and enabling user authentication for a contactless ATM transaction, according to certain embodiments disclosed herein.

Example Operating Environment for Scheduling and Enabling, by a Bank System, User Authentication for a Contactless ATM Transaction Referring now to the drawings, FIG. 1 depicts an example of a computing environment 100 for scheduling and enabling user authentication, by a bank system 130, for a contactless ATM transaction. The computing environment 100 includes a user computing device 110, an automated teller machine ("ATM") 120, and a bank computing system 130.

In certain embodiments, the user computing device 110 includes a user interface 111, a data storage unit 113, a near field communication controller ("NFC controller") 115, a near-field communication antenna ("NFC antenna") 116, and banking application 119.

The user interface 111 enables the user to interact with the user computing device 110. The user interface 111 may be a touch screen interface, a voice-based interface, or any other interface that allows the user 101 to provide input and receive output from one or more applications on the user computing device 110. In an example, the user 101 interacts via the user interface 111 with the banking application 119.

The data storage unit 113 can be a local or remote storage device or other memory suitable for storing information and accessible to the user computing device 110. In an example, the data storage unit 115 stores encrypted information. In certain embodiments, the data storage unit 113 may be implemented in a secure element or other secure memory (not shown) on the user device 120. In other embodiments, the data storage unit 113 may be a separate memory unit resident on the user computing device 110. The data storage unit 113 may be accessible to the banking application 119 and store a unique transaction number ("UTN") 135 and/or a security code 137 generated by the bank system 130.

The NFC controller 115 is capable of sending and receiving data, performing authentication and ciphering functions, and directing how the user computing device 110 will listen for transmissions from other NFC-capable devices (including the ATM 120), and/or configuring the user computing device 110 into various power-save modes according to NFC-specified procedures. An example NFC controller 115 communicates with the ATM 120 and is capable of sending and receiving data over a wireless, NFC communication channel. In certain embodiments, a user using the user computing device 110 can initiate a contactless "tap" with the ATM 120. For example, the user 101 "taps" the user computing device 110 to an NFC reader 126 of the ATM 120. The ATM 120 recognizes the NFC-enabled user computing device 110 when the user computing device 110 is moved within a predefined communication range of the NFC reader 126. In an example, the NFC controller 115 polls through the antenna 116 a radio signal, or listens for radio signals from the ATM 120. The NFC controller 115 establishes a secure wireless communication channel with the ATM 120, and transmits a unique transaction number ("UTN") 135 and/or a security code 137 to the ATM 120 via the wireless communication channel. In an example, the NFC controller 115 activates the NFC antenna 116 to create the wireless communication channel between the user computing device 110 and the ATM 120. For example, the user computing device 110 communicates with the ATM 120 via the antenna 116. The authorization module 129 of the ATM 120 and the banking application 119 of the user computing device 110 may exchange one or more cryptographic keys and establish a secure, encrypted NFC communication channel 150.

In other embodiments, the user computing device 110 comprises a Wi-Fi controller, a Bluetooth controller, Bluetooth low energy ("BLE") controller, or other controller performing similar functions. In another example, a Wi-Fi controller, Bluetooth controller, BLE controller, or other controller performs similar functions as the NFC controller 115 using Wi-Fi, Bluetooth, BLE, or other protocols.

The banking application 119 is a program, function, routine, or similar entity that exists on and performs its operations on the user computing device 110. The banking application 119 may be associated with the bank system 130. For example, the user of the user computing device 110 may access, via the user computing device 110 over the network 140, a website of the bank system and download the banking application 119. The banking application 119 may communicate with the bank system 130 via the network 140. The banking application may 119 may receive data via one or more inputs to the user interface 111. The banking application 119 may receive, via the user interface 111, an input indicating a request to initiate the anticipated ATM 120 transaction and establish, via the NFC controller 115 and NFC antenna 116, a communication channel with the ATM 120 responsive to the user computing device 110 being placed within a predefined proximity to a reader device 126 of the ATM 120 and may transmit to and/or receive data from the ATM 120 via the wireless communication channel.

In certain embodiments, the ATM 120 is a computing device that enables customers of the bank system 130 to perform financial transactions (e.g. cash withdrawals, deposits, transfers, etc.), balance inquiries, or other account information inquiries. The ATM 120 can include a user interface 121, a data storage unit 123, an NFC controller 125, an NFC antenna 126, a transaction processing module 127, and an authorization module 129. In certain embodiments, the ATM 120 can communicate with the bank system 130 via the network 140 and may send and/or receive data from the bank system 130 via the network 140. In certain embodiments, the ATM 120 can communicate with the bank system 130 via a private network and may send and/or receive data from the bank system 130 via the private network.

The user interface 121 enables a user to interact with the ATM 120. The user interface 121 can include a touch screen interface, a voice-based interface, and/or any other interface that allows users to provide input and receive output from one or more applications on the ATM 120. In certain examples, the user interacts via the user interface 121 using one or more voice inputs.

The microphone device 122 is configured to receive one or more sound inputs from an environment of the ATM 120. In some examples, the user awakens the ATM 120, which is in a sleep or other power conservation mode, with a voice request and then taps the user computing device 110 to the NFC reader 126 to transmit the UTN 135 to the ATM 120. In these examples, the ATM 120 receives the sound input of the voice request, converts the sound input into one or more sound inputs into one or more electrical signals, and transmits the electrical signals representing the sound inputs to the authorization module 129.

The data storage unit 123 can be a local or remote storage device or other memory suitable for storing information and accessible to the ATM 120. In an example, the data storage unit 123 stores encrypted information. In certain embodiments, the data storage unit 123 may be implemented in a secure memory. The data storage unit 123 can be accessible to the transaction processing module 127 and the authorization module 129.

The NFC controller 125 is capable of sending and receiving data, performing authentication and ciphering functions, and directing how the ATM 120 will listen for transmissions from other NFC-capable devices (including the user computing device 110), and/or configuring the ATM 120 into various power-save modes according to NFC-specified procedures. An example NFC controller 125 communicates with the user computing device 110 and is capable of sending and receiving data over a wireless, NFC communication channel. In certain embodiments, a user using the user computing device 110 can initiate a contactless "tap" with the ATM 120. For example, the user 101 "taps" the user computing device 110 to an NFC reader 126 of the ATM 120. The ATM 120 recognizes the NFC-enabled user computing device 110 when the user computing device 110 is moved within a predefined communication range of the NFC reader 126. In an example, the NFC controller 125 polls through the NFC reader 126 (which includes an NFC antenna) a radio signal, or listens for radio signals from the user computing device 110. The NFC controller 125 establishes a secure wireless communication channel with the user computing device 110, and receives a unique transaction number ("UTN") 135 and/or a security code 137 from the user computing device 110 via the wireless communication channel. In an example, the NFC controller 125 activates the NFC reader 126 (which includes an NFC antenna) to create the wireless communication channel between the user computing device 110 and the ATM 120. For example, the ATM 120 communicates with the user computing device 110 via the antenna 126. The authorization module 129 of the ATM 120 and the banking application 119 of the user computing device 110 may exchange one or more cryptographic keys and establish a secure encrypted NFC communication channel 150.

The transaction processing module 127 on the ATM 120 can be configured to perform one or more operations. The one or more operations could include processing a transaction in accordance with transaction details associated with a UTN 135, responsive to the authorization module 129 verifying that a security code 137 received from the user computing device 110 matches a security code 137 associated with the UTN 135 received from the bank system 130. In certain embodiments, processing a transaction includes dispensing a cash withdrawal from the ATM 120.

The authorization module 129 of the ATM 120 can be configured to perform one or more operations. Operations to process an anticipated ATM 120 transaction can include, but are not limited to, receiving a request to process an anticipated ATM 120 transaction, displaying a request for a UTN 135 via the user interface 121, establishing an NFC wireless communication channel with the user computing device 110 via the NFC controller 125 and the NFC reader 126, receiving the UTN 135 via the wireless communication channel, transmitting the UTN 135 to the bank system 130, receiving a predefined security code 137 and transaction details associated with the UTN 135 from the bank system 130, displaying the transaction details via the user interface 121, receiving a security code 137 from the user computing device 110 via an NFC wireless communication channel, and comparing the security code 137 received from the user computing device 110 to the security code 137 received from the bank system. The operations can also include, in some instances, maintaining the ATM 120 in a sleep or other power conservation mode until receipt of a voice request forwarded to the authorization module 129 by the microphone device 122 and then, upon determining that the voice request includes a request to perform the anticipated ATM 120 transaction, wakes the ATM 120 from the sleep or other power conservation mode and performs the operations to process the anticipated ATM 120 transaction.

In certain embodiments, the bank system 130 is a network server or other computing device connected to a network 140. The bank system 130 could be associated with a bank or other financial institution (e.g. a credit union). In certain embodiments described herein, a user associated with a user computing device 110 has one or more financial accounts with the bank system 130. In certain embodiments, the bank system 130 communicates with one or more ATMs 120 via the network 140. The bank system 130 may communicate, via the network 140, with ATMs 120 associated with the bank system 130 and, in certain embodiments, may also communicate with ATMs 120 not associated with the bank system 130, for example, ATMs 120 of financial institutions other than the bank system 130.

The bank system 130 (including the authorization module 139) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the bank system 130 (including the authorization module 139) can be implemented using more or fewer systems or subsystems than those shown in FIG. 1, may combine two or more subsystems, or may have a different configuration or arrangement of the systems or subsystems.

In some examples, the bank system 130 comprises a data storage unit 133 and an authorization module 139. The data storage unit 133 may comprise a local or remote storage device or other memory suitable for storing information and accessible to the bank system 130. In an example, the data storage unit 115 stores encrypted information. The bank system 130 may generate a unique transaction number ("UTN") 135 for the anticipated ATM 120 transaction as well as a security code 137 that is associated with the UTN 135 and store the UTN 135 and the security code 137 in the data storage unit 133. The bank system 130 may store transaction details associated with the UTN 135, a time of expiration for the UTN 135, or other information associated with the UTN 135 in the data storage unit 133.

The authorization module 139 can receive a request to authorize an anticipated ATM 120 transaction from a user computing device 110 via the network 140. In certain embodiments, the authorization module 139 communicates with a banking application 119 on the user computing device 110 and receives the request to authorize the anticipated ATM 120 transaction from the banking application 119. The request to authorize the anticipated ATM 120 transaction may include transaction details associated with the anticipated ATM 120 transaction, for example, an amount of the transaction, a type of transaction (e.g. cash withdrawal, deposit, transfer, etc.), an account identifier of the user, a selection or other identification of the ATM 120 at which the user desires to conduct the transaction, and/or other transaction details. The authorization module 139 generates a unique transaction number ("UTN") 135 for the anticipated ATM 120 transaction as well as a security code 137 that is associated with the UTN 135. In certain examples, the authorization module 139 uses a random number generator to generate the UTN 135 or selects the UTN 135 from a list of pre-generated UTNs (e.g. a list of sequential transaction numbers). In some examples, the authorization module 139 generates an expiration time stamp for the UTN 135 that identifies a time of expiration for the UTN 135 and associates the expiration time stamp with the UTN 135. For example, the time of expiration may be a predefined time period (e.g. one hour, two hours, five hours, or other predefined time period) from a current time at which the request from the user computing device 110 to authorize the ATM 120 transaction is received. The authorization module 139 stores the UTN 135, transaction details associated with the UTN 135, the security code 137, and any other information associated with the UTN 135 and/or security code 137 in the data storage unit 133.

Figure 2:
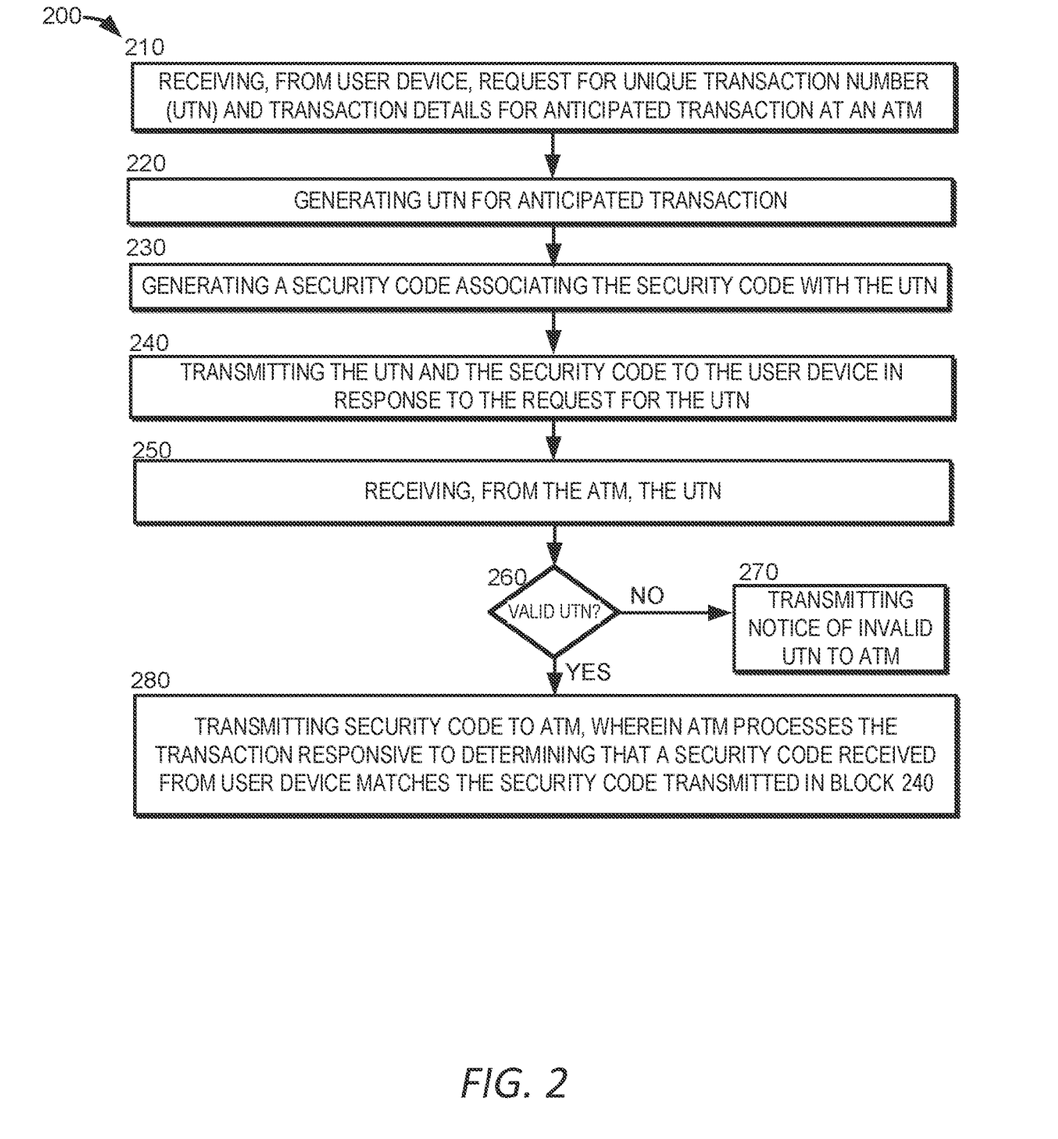
FIG. 2 depicts an example of a process for scheduling and enabling user authentication for a contactless ATM transaction by a bank computing system, according to certain embodiments disclosed herein.
Figure 3:
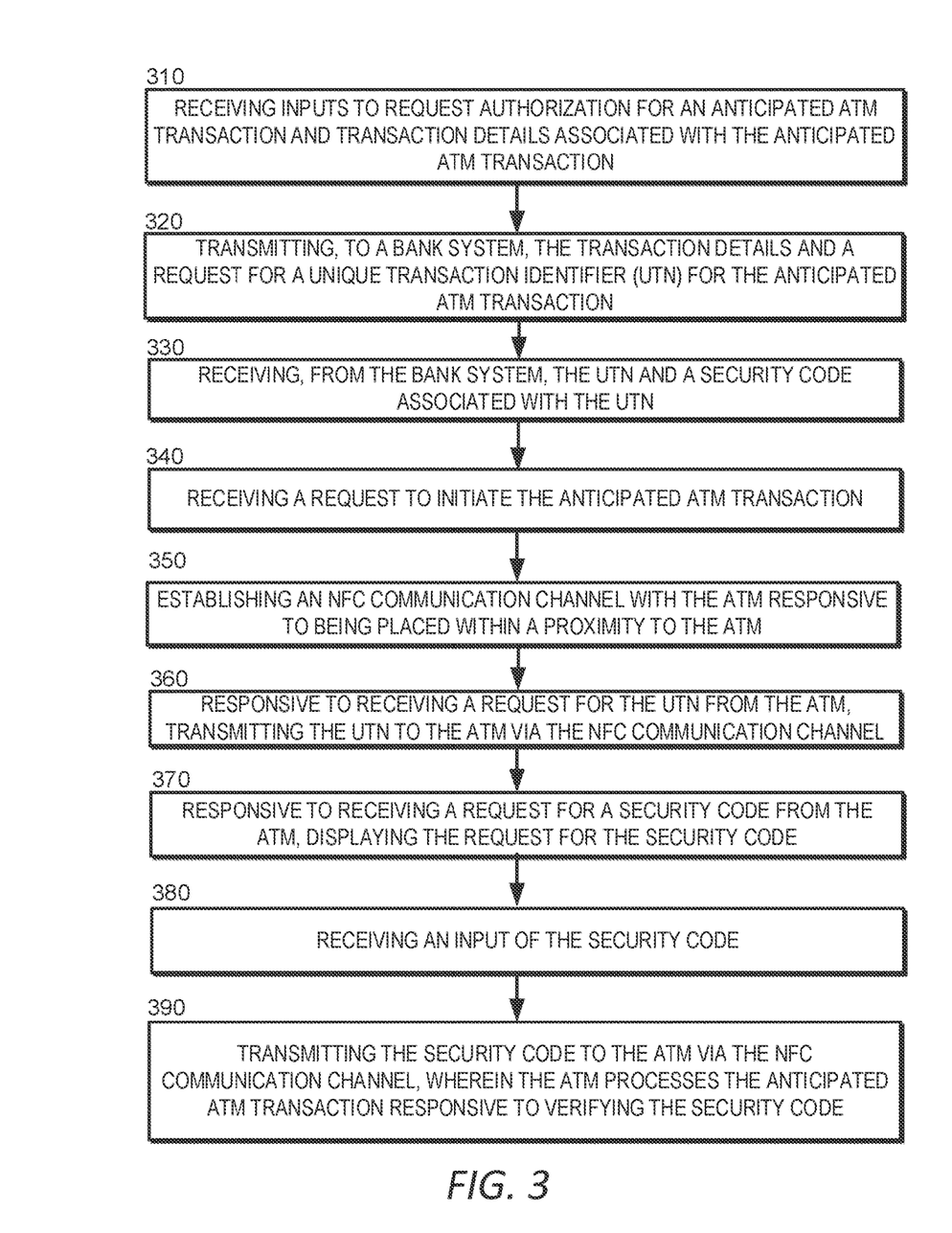
FIG. 3 depicts an example of a process for requesting authorization for and initiating, by a user computing device, an anticipated contactless ATM transaction, according to certain embodiments disclosed herein.
Figure 4:
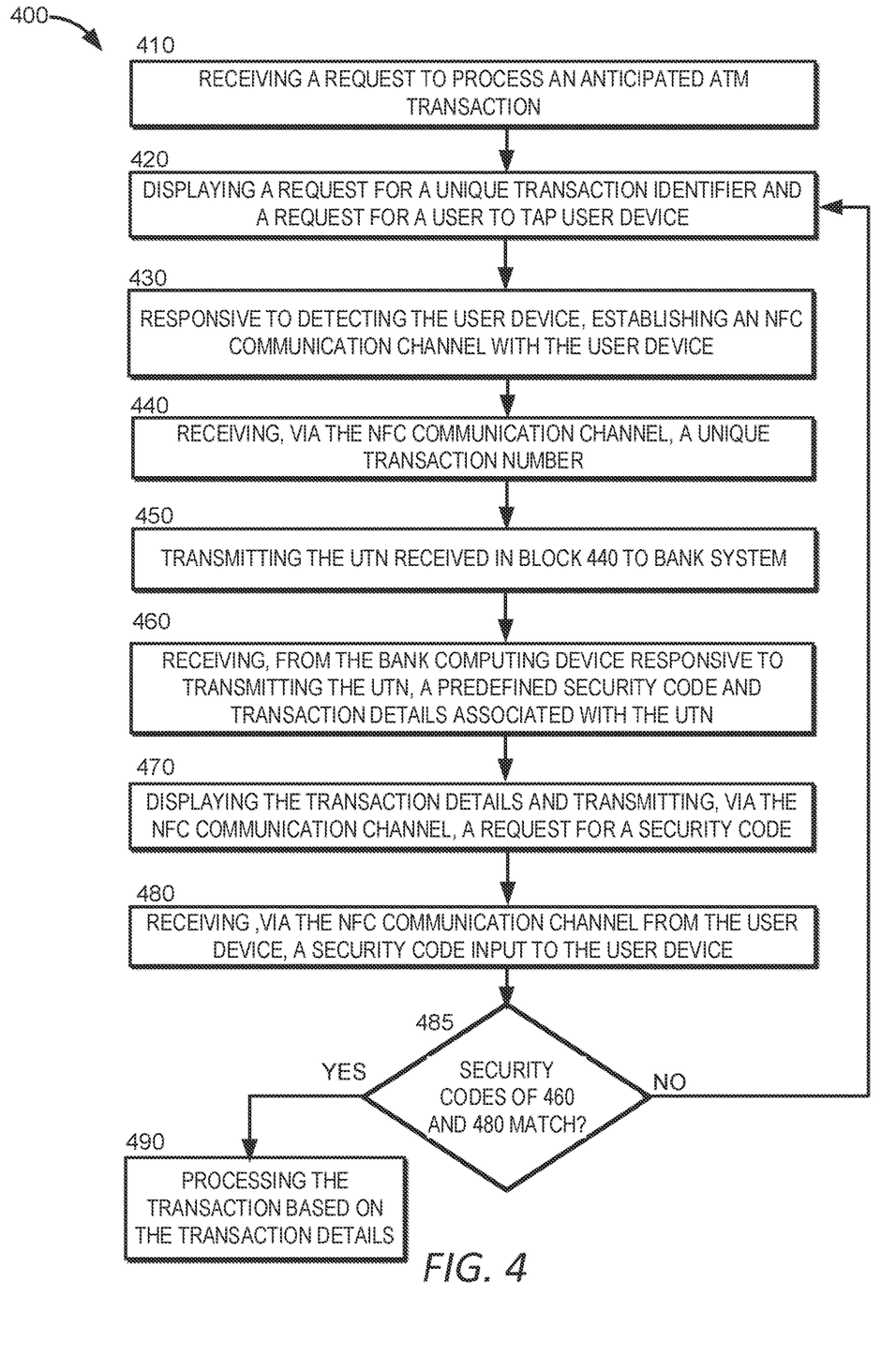
FIG. 4 depicts an example of a process for processing, by an ATM, a scheduled transaction and authenticating a user associated with the transaction in a contactless manner, according to certain embodiments disclosed herein.

Examples of Computer-Implemented Operations for Scheduling and Enabling User Authentication for Contactless ATM Transactions FIG. 2, FIG. 3, and FIG. 4 depict examples of processes 200, 300, and 400, respectively, for preauthorizing and enabling user authentication for contactless ATM 120 transactions as performed from a perspective of a bank system 130, a perspective of a user computing device 110, and a perspective of an ATM 120, respectively. Accordingly, one or more steps in process 200 may be performed along with one or more steps in processes 300 and 400, one or more steps in process 300 may be performed along with one or more steps of processes 200 and 400, and one or more steps in process 400 may be performed along with one or more steps of processes 200 and 300. For example, as a user computing device 110 performing certain steps of process 300 may interact, at various steps, with a bank system 130 performing certain steps of process 200 and with an ATM 120 performing certain steps of process 400.

FIG. 2 depicts an example of a process 200 for preauthorizing and enabling user authentication, by a bank system, user authentication for a contactless ATM transaction. One or more computing devices (e.g., bank system 130 or the individual modules contained therein) implement operations depicted in FIG. 2. For illustrative purposes, the process 200 is described with reference to certain examples depicted in the figures. Other implementations, however, are possible.

At block 210, the method 200 involves receiving, by the authorization module 139 from a user computing device 110, a request for a UTN 135 and transaction details for an anticipated ATM 120 transaction. The anticipated ATM 120 transaction may be a cash withdrawal or other transaction from an ATM associated with the bank system. In some examples, the bank system 130 is a bank computing system or other financial computing system (e.g. credit union computing system) and the user computing device 110 is associated with a customer of the bank or other financial institution. The user computing device 110 may include a banking application 119 which communicates with the authorization module 139 of the bank system 130 via a network 140 to transmit the request for the UTN 135 and the transaction details for the anticipated ATM 120 transaction. Transaction details could include a transaction amount, a selected account of the user with the bank system 130, an anticipated time of the ATM 120 transaction, an expiration time for the ATM 120 transaction, a particular ATM 120 device for the transaction, or other relevant transaction information. For example, the user requests a cash withdrawal of five hundred dollars from the user's checking account at 3:00 p.m. Eastern time at an ATM 120 associated with a particular address.

At block 220, the method 200 involves generating, by the authorization module 139, the UTN 135 for the anticipated ATM 120 transaction. In certain examples, the UTN 135 is selected from a predefined list of sequential identifiers. In other examples, the authorization module 139 uses a random number generator to generate the UTN 135. In some instances, the UTN 135 is a sequence of one or more of numbers, letters, symbols, and/or other characters. In certain examples, the authorization module 139 associates one or more validity conditions with the UTN 135, for example, a time of expiration or a specific ATM 120 for which the anticipated transaction is valid. For example, the authorization module 139 associates a time stamp with the UTN 135 that specifies the time of expiration for the UTN 135. For example, the UTN 135 is valid for a predefined amount of time (e.g. 2 hours, 4 hours, or other predefined period of time) from the current time, or is valid for a predefined amount of time (e.g. 2 hours, 4 hours, or other predefined period of time) past the anticipated time of the ATM 120 transaction as specified in the transaction details. In other examples, the time of expiration for the UTN 135 is specified in the transaction details received from the user computing device. In certain examples, the authorization module 139 associates the UTN 135 with a particular ATM 120 (e.g. associated with an ATM 120 device identifier) specified in the transaction details. In another example, the particular ATM 120 is not specified in the transaction details and the authorization module 139 selects, from a set of possible ATMs 120, an ATM 120 that is closest to a current location of the user computing device 110. The authorization module 139 may associate the UTN 135 with the transaction details received from the user computing device 110 and store the UTN 135 in a data storage unit 133 accessible to the authorization module 139 along with the associated transaction details and any other information associated with the UTN 135 (e.g. an ATM 120 device identifier, an expiration time stamp for the UTN 135, etc.).

At block 230, the method 200 involves generating, by the authorization module 139, a security code 137 and associating the security code 137 with the UTN 135. The authorization module 139 may generate the security code 137 using a random number generator. In some instances, the security code 139 is a sequence of one or more of numbers, letters, symbols, or other characters. The bank system 130 can store the security code 139 along with the UTN 135 in the data storage unit 133.

At block 240, the method 200 involves transmitting, by the authorization module 139, the UTN 135 and the security code 137 to the user computing device 110 in response to the request for the UTN 135. For example, the authorization module 139 transmits the UTN 135 and the security code 137 to the banking application 119 on the user computing device 110. In certain examples, the authorization module 139 transmits the UTN 135 to the user computing device 110 banking application 119 via a text message, an email communication, notification, or other means of communication. The banking application 119 may store the UTN 135 and/or the security code 137 in the data storage unit 113 of the user computing device 110.

At block 250, the method 200 involves receiving, by the authorization module 139 from the ATM 120, the UTN 135. In certain examples, the user associated with the user computing device 110 requests the UTN 135, and receives the UTN 135 and security code 137 at a location other than the ATM 120 associated with the anticipated ATM 120 transaction. For example, the user receives the UTN 135 and security code 137 at home and then travels to the ATM 120 to conduct the anticipated ATM 120 transaction. In certain examples, a time elapses (e.g. thirty seconds, a minute, five minutes, thirty minutes, two hours, or other amount of time) from when the user computing device 110 receives the UTN 135 and security code 137 and a time at which the user initiates the anticipated ATM 120 transaction. In certain examples, the user approaches the ATM 120 and taps the user computing device 110 to the NFC reader 126 of the ATM 120 to establish an NFC communication channel 150 and transmit the UTN 135 to the ATM 120, which forwards the received UTN 135 to the authorization model 139 via the network 140. The authorization module 139 may receive a device identifier or other identifier associated with the ATM 120 with the UTN 135.

At block 260, the method 200 involves determining, by the authorization module 139, whether the received UTN 135 is a valid UTN 135. The authorization module 139 may retrieve, from the data storage unit 137, the transaction details associated with the UTN 135 and, in some instances, other information associated with the UTN 135 and determine whether the received UTN 135 is valid based at least in part on one or more validity conditions associated with the UTN 135. The authorization module 139 may compare the validity conditions with the transaction details, other information associated with the UTN 135, information received from the ATM 120 (e.g. the ATM 120 device identifier) to determine whether the validity conditions are satisfied. For example, the UTN 135 may include or be associated with a time stamp that specifies a time of expiration for the UTN 135. In another example, the UTN 135 is valid for a predefined amount of time (e.g. 2 hours, 4 hours, or other predefined period of time) past the anticipated time of the anticipated ATM 120 transaction as specified in the transaction details. In other examples, the time of expiration for the UTN 135 is specified in the transaction details received from the user computing device. In certain examples, the UTN 135 is associated with a particular ATM 120 (e.g. associated with an ATM device identifier) specified in the transaction details.

If the authorization module 139 determines that the UTN 135 received from the ATM 120 is not valid, the method 200 proceeds to block 270. In some instances, the authorization module 139 determines that the UTN 135 is not valid because one or more validity conditions associated with the UTN 135 are not satisfied. For example, a current time associated with receipt of the UTN 135 by the authorization module 139 is later than a time indicated on an expiration time stamp associated the UTN 135. In some instances, the authorization module 139 determines that the UTN 135 is invalid because the UTN 135 is received from an ATM 120 that is different than the ATM 120 specified in the transaction details associated with the UTN 135. For example, the transaction details specify an ATM 120 with hardware identifier A but the authorization module 139 receives the UTN 135 from ATM 120 having a hardware identifier B and, therefore, determines that the received UTN 135 is invalid.

At block 270, the method 200 involves transmitting, by the authorization module 139, a notice to the ATM 120 that the received UTN 135 is not a valid UTN 135. In some instances, the authorization module 139 includes, with the notice, a reason code, a text explaining one or more validity conditions on the UTN 135 that were not satisfied, or other explanation of why the UTN 135 was determined to be invalid. The ATM 120 may display, via the user interface 121, the notice and/or the text, reason code, or other indication received from the bank system 130.

Returning to block 260, if the authorization module 139 determines that the UTN 135 received from the ATM 120 is valid, the method 200 proceeds to block 280. In some instances, the authorization module 139 determines that the UTN 135 is valid because the one or more validity conditions associated with the UTN 135 is satisfied. For example, a current time associated with receipt of the UTN 135 by the authorization module 139 is earlier than a time indicated on an expiration time stamp associated the UTN 135 and the UTN 135 is received from an ATM 120 corresponding to the ATM 120 specified in the transaction details associated with the UTN 135. For example, the transaction details specify an ATM 120 with hardware identifier A and the authorization module 139 receives the UTN 135 from ATM 120 having a hardware identifier A and, therefore, determines that the received UTN 135 is valid.

At block 280, the method 200 involves transmitting, by the authorization module 139, the security code 137 to the ATM 135, wherein the ATM 120 processes the anticipated transaction responsive to determining that a security code 137 received from the user computing device 110 matches the security code 137 transmitted in block 240. In certain examples, the anticipated ATM 120 transaction is a cash withdrawal and processing the anticipated ATM 120 transaction includes dispensing a quantity of cash associated with an amount as specified in the transaction details. In some instances, processing the anticipated ATM 120 transaction includes depositing an amount into an account, transferring an amount between accounts, checking an account balance, printing an account statement, or other transaction that may be processed by the ATM 120.

FIG. 3 depicts an example of a process 300 for requesting authorization for and initiating, by a user computing device, an anticipated contactless ATM transaction, in accordance with certain embodiments described herein. One or more computing devices (e.g., a user computing device 110, the banking application 119, or other individual applications of the user computing device 110) implement operations depicted in FIG. 3. For illustrative purposes, the process 300 is described with reference to certain examples depicted in the figures. Other implementations, however, are possible.

In some examples, the bank system 130 is a financial institution (e.g. a bank, a credit union, etc.) and the user computing device 110 is associated with a customer of the bank. The user computing device 110 may include a banking application 119 which communicates with the bank system 130 via a network 140. For example, the user of the user computing device 110 may access a website of the bank system and download the banking application 119 via the network 140. In other examples, the banking application 119 is a web browser application of the user computing device 110.

At block 310, the method 300 involves receiving, by the user computing device 110, inputs to request authorization for an anticipated ATM 120 transaction and transaction details associated with the anticipated ATM 120 transaction. For example, the user may input the transaction details via the user interface 111 using the banking application 119 operating on the user computing device 110. Transaction details could include a transaction amount, a selected account of the user with the bank system 130, an anticipated date and time of the anticipated ATM 120 transaction, an expiration time for the transaction, a particular ATM 120 for the transaction, or other relevant transaction information. For example, the user requests a cash withdrawal of five hundred dollars from the user's checking account at 3:00 p.m. Eastern time at a particular ATM 120 associated with an address near the user's current location. The banking application 119 may display, via the user interface 111 one or more user interface 111 objects and the user inputs the transaction details by actuating one or more user interface 111 objects (e.g. inputting text to text fields, selecting buttons, sliding slider bars, selecting from a drop down list, or other selection or manipulation of user interface 111 objects).

At block 320, the method 300 involves transmitting, by the user computing device 110 to a bank system 130, the transaction details and a request for a UTN 135 for the anticipated ATM 120 transaction. In an example, the banking application 119 may display, via the user interface 111 a user interface 111 object that is selectable to transmit a request a UTN 135 for an anticipated ATM 120 transaction associated with the input transaction details. In this example, the user selects the user interface 111 object and the banking application 119 transmits the transaction details and the request for the UTN 135 for the anticipated ATM 120 transaction responsive to receiving the selection of the user interface 111 object.

At block 330, the method 300 involves receiving, by the user computing device 110 from the bank system 130, the UTN 135 and a security code 137 associated with the UTN 135. In certain examples, the user computing device 110 receives the security code 137 via the banking application 119. In other examples, the user computing device 110 receives the security code 137 via a separate application from the banking application 119, for example, via an email application, a messaging application, or other application of the user computing device 110. The bank system 130 generates a UTN 135 for the anticipated ATM 120 defined by the transaction details. In some instances, the UTN 135 is a sequence of one or more of numbers, letters, symbols, and/or other characters. The security code 137 may be a sequence of one or more of numbers, letters, symbols, or other characters. In certain examples, the security code is a melody-based or a voice-based security code that is set up by the user of the user computing device 110.

In certain examples, the UTN 135 is associated with one or more validity conditions specified by the transaction details and/or by the banking system 130. The banking application 119 may display, via the user interface 111, the validity conditions so that the user understands at which ATM 120 to conduct the anticipated ATM 120 transaction and/or any expiration time associated with the anticipated ATM 120 transaction. For example, the UTN 135 may be valid for a predefined amount of time from the current time, or valid for a predefined amount of time past the anticipated time of the ATM 120 transaction as specified in the transaction details. In other examples, the time of expiration for the UTN 135 was configured in the transaction details transmitted previously by the user computing device 110. In another example, the UTN 135 is associated with a particular ATM 120 (e.g. associated with an ATM 120 device identifier) specified in the transaction details or with a particular ATM 120 that is a closest ATM 120 to a user's location at the time the request for the UTN 135 is received by the bank system 130.

At block 340, the method 300 involves receiving, by the user computing device 110 a request to initiate the anticipated ATM 120 transaction. The user can approach the ATM 120 and access the banking application 119 on the user computing device and selects one or more user interface 111 objects to select the anticipated ATM 120 transaction and request authorization for the anticipate ATM 120 transaction. In some instances, the user first activates the ATM 120 using a voice command (e.g. "I need to withdraw cash!"), the ATM 120 detects the voice command, and displays a request for the user to open the banking application 119 on the user computing device 110, select an anticipated ATM 120 transaction, and tap the user computing device 110 to an reader device 126 of the ATM 120. The banking application 119 can receive the inputs and, responsive to receiving the inputs, display a request to tap the user computing device 110 to an NFC reader 126 of the ATM 120.

At block 350, the method 300 involves establishing, by the user computing device 110 an NFC communication channel 150 with the ATM 120 responsive to being placed within a proximity to the ATM 120. The reader device 126 and the NFC controller 116 may be configured to establish a near-field communication ("NFC") communication channel 150 between the user computing device 110 and the ATM 120 responsive to detecting of the other respective device. In response to the user tapping the user computing device 110 (e.g. moving the user computing device 110 to within a predefined proximity to the NFC reader 126 of the ATM 120 such that a communication channel 150 can be established), the NFC reader 126 of the ATM 120 and the user computing device 110 establish the NFC communication channel 150. The user computing device 110 transmits the UTN 135 to the ATM 120 via the NFC communication channel 150.

At block 360, the method 300 involves transmitting, by the user computing device 110 responsive to receiving a request for the UTN 135 from the ATM 120, the UTN 135 to the ATM 120 via the NFC communication channel 150.

The ATM 120 (e.g. authorization module 126) may transmit, to the banking application 119 via the NFC communication channel 150, the request for a UTN 135 and receive, from the banking application 119, the UTN 135. The ATM 120 may transmit the received UTN 135 to the bank system 130 via the network 140 along with its device identifier and receive, from the bank system 130, an indication of whether the UTN 135 is valid or invalid. Example operations of the bank system 130 to determine whether the UTN 135 is a valid or invalid UTN 135 are described in blocks 250-280 of FIG. 2. Responsive to receiving, from the bank system 130, an indication that the UTN 135 is valid, the ATM 120 can receive, from the bank system 130, a security code 137 associated with the UTN 135 and request, via the NFC communication channel 150, a security code 137 from the user computing device 110.

At block 370, the method 300 involves displaying, by the user computing device 110 responsive to receiving a request for the security code from the ATM 120, the request for the security code 137. In certain examples, the user computing device 110 receives the request for the security code 137 via the same NFC communication channel 150 via which the user computing device 110 previously transmitted the UTN 135 to the ATM 120. However, in other examples, the user computing device 110 transmits the UTN 135 to the ATM 120 via a first NFC communication channel 150 (a first NFC session) via a first tap of the user computing device 110. In these other examples, the first NFC session ends and, in a second tap of the user computing device 110, the user computing device 110 establishes a second NFC communication channel 150 and receives the request for the security code 137 from the ATM 120 via the second NFC communication channel 150. In these other examples, the ATM, responsive to receiving the security code 137 from the bank system 130, displays a request for the user to conduct a second tap of the user computing device 110 with the NFC reader 126 and establishes the second NFC communication channel 150 to receive the security code 137 from the user computing device 110 responsive to detecting the user computing device 110 in the second tap. The banking application 119 can display, via the user interface 111, the request for the security code 137. For example, the request can include a field or other user interface 111 object that enables the user to input the security code 137 to the banking application 119.

At block 380, the method 300 involves receiving, by the user computing device 110, an input of the security code 137. For example, the user selects one or more objects on the user interface 111 to input the security code. For example, the user inputs the security code 137 receives from the bank system 130, which includes a sequence of one or more characters, numbers, and/or symbols to the user interface 111 and the banking application 119 receives the security code 137 input via the user interface 111. In certain examples, the user accesses the security code 137 via the banking application 119. In other examples, the user accesses the security code 137 via a separate application 119, for example, an email application, a messaging application, or other application via which the user received the security code 137 from the banking application 119.

At block 390, the method 300 involves transmitting, by the user computing device 110, the security code 137 to the ATM 120 via the NFC communication channel 150, wherein the ATM 120 processes the anticipated ATM 120 transaction responsive to verifying the security code 137. The ATM 120 can processes the transaction in accordance with the transaction details associated with the UTN 135. In certain examples, the ATM 120 receives the transaction details for the anticipated ATM 120 transaction along with the UTN 135. For example, the transaction details associated with the UTN 135 may specify a cash withdrawal from the user's checking account of five hundred dollars and processing the transaction involves removing five hundred dollars from the user's checking account and dispensing five hundred dollars in physical cash notes to the user via the ATM 120.

FIG. 4 depicts an example of a process 400 for processing, by an ATM, an anticipated ATM 120 transaction and authenticating a user associated with the transaction in a contactless manner, in accordance with certain embodiments described herein. One or more computing devices (e.g., the ATM 120 or the individual modules contained therein) implement operations depicted in FIG. 4. For illustrative purposes, the process 400 is described with reference to certain examples depicted in the figures. Other implementations, however, are possible.

At block 410, the method 400 involves receiving, by the ATM 120, a request to process an anticipated ATM 120 transaction. The user may awaken the ATM 120, which is in a sleep or other power conservation mode, with a voice request directing the ATM 120 to perform an anticipated ATM 120 transaction. For example, authorization module 129 detects, via the microphone device 122, a user voice command of "I need to withdraw cash!" and, responsive to determining that the voice command includes a request to process an anticipated ATM 120 transaction, awakens the ATM 120 from the sleep or other power conservation mode. The authorization module 129 may compare the received voice command against a list of possible voice commands and only awaken the ATM 120 responsive to receiving a voice command that corresponds with a voice command on the list. In some instances, the authorization module 129 awakens the ATM 120 from the sleep or responsive to receiving an initial voice command (e.g. "Good morning!") and then receives a subsequent voice command (e.g. "I want to withdraw cash!") including the request to process the anticipated ATM 120 transaction.

At block 420, the method 400 involves displaying, by the ATM 120, a request for a UTN 135 and a request for a user to tap the user computing device 110. For example, responsive to determining that a voice command to process an anticipated ATM 120 transaction has been received via the microphone device 122, the authorization module 129 instructs the user interface 121 to display the request to tap the user computing device 110 to the NFC reader 126 of the ATM 120. Determining that the voice command instructs the ATM 120 to process an anticipated ATM 120 transaction could include comparing the received voice command to a list of voice commands (e.g. stored in the data storage unit 123) that are associated with processing an anticipated ATM 120 transaction. The authorization module 129 may also instruct the NFC controller 125 to poll through the NFC reader 126 (which includes an NFC antenna) a radio signal, or listen for radio signals associated with a tap of the user computing device 110 to the NFC reader 126.

At block 430, the method 400 involves establishing, by the ATM 120 responsive to detecting the user computing device 110, an NFC communication channel 150 with the user computing device 110. For example, the user 101 "taps" the user computing device 110 to the NFC reader 126 of the ATM 120. The ATM 120 recognizes the NFC-enabled user computing device 110 when the user computing device 110 is moved within a predefined communication range of the NFC reader 126. In an example, the NFC controller 125 activates the NFC reader 126 (which includes an NFC antenna) to create the wireless NFC communication channel 150 between the user computing device 110 and the ATM 120. For example, the ATM 120 communicates with the user computing device 110 via the antenna. The authorization module 129 of the ATM 120 and the banking application 119 of the user computing device 110 may exchange one or more cryptographic keys and establish a secure NFC communication channel 150. Example operations to establish, by the user computing device 110, the NFC communication channel 150 with the ATM 120 are described in block 350 of FIG. 3.

At block 440, the method 400 involves receiving, by the ATM 120 via the NFC communication channel 150, a UTN 135. The authorization module 129 can receive the UTN 135 from the user computing device 110 via the secure NFC communication channel 150 during the tap of the user computing device 110. Example operations to transmit, by the user computing device 110, the UTN 135 to the ATM 120 are described in block 360 of FIG. 3.

At block 450, the method 400 involves transmitting, by the ATM 120, the UTN 135 received in block 440 to the bank system 130. For example, the ATM 120 forwards the UTN 135 to the bank system 130 via the network 140. Example operations of the bank system 130 to determine whether the UTN 135 is a valid or invalid UTN 135 are described in blocks 250-280 of FIG. 2.

At block 460, the method 400 involves receiving, by the ATM 120 from the bank system 130 responsive to transmitting the UTN 135 in block 450, a predefined security code 137 and transaction details associated with the UTN 135. For example, the transaction details may specify a $500 cash withdrawal from account A of user A. Example operations of the bank system 130 to transmit the security code 137 and transaction details to the ATM 120 are described in block 280 of FIG. 2.

At block 470, the method 400 involves displaying, by the ATM 120, the transaction details and transmitting, via an NFC communication channel 150, a request for a security code. The authorization module 129 may display, via the user interface 121, the transaction details and a request to tap the user computing device 110 to the NFC reader 126. For example, the user interface 121 may display a request reading "please tap mobile device to reader and input security code via mobile device to proceed with $500 cash withdrawal" to convey the transaction details and the request for the security code 137.

At block 480, the method 400 involves receiving, by the ATM 120 via the NFC communication channel 150 from the user computing device 110, a security code 137 input to the user computing device 110. Example operations to transmit, by the user computing device 110, the security code 137 to the ATM 120 are described in blocks 370-390 of FIG. 3.

At block 485, the method 400 involves determining whether the security code 137 received from the user computing device 110 in block 480 matches the security code 137 received from the bank system 130 in block 460. In some examples, a match indicates an exact correspondence between the security code 137 received from the user computing device 110 and the security code 137 received from the bank system 130.

If the security codes 137 received in blocks 460 and 480 do not match, the method 400 returns to block 420. For example, each security code 137 comprises a sequence of numbers, symbols, characters, and/or other data and at least one of the data in the sequence in the security code 137 received from the user computing device 110 does not correspond to a corresponding data in the sequence in the security code 137 received from the bank system 130.

Returning to block 480, if the security codes 137 received in blocks 460 and 480 match, the method 400 proceeds to block 490. For example, the authorization module 129 determines that the sequence of data in the security code 137 received from the user computing device 110 exactly corresponds to the sequence of data in the security code 137 received from the bank system 130.

At block 490, the method 400 involves processing, by the ATM 120, the anticipated ATM 120 transaction based on the transaction details. For example, the transaction processing module 127 processes the anticipated ATM 120 transaction according to parameters defined in the transaction details associated with the UTN 135 that are received from the bank system 130. For example, the transaction details specify a cash withdrawal from the user's checking account of five hundred dollars and processing the transaction involves debiting or otherwise removing five hundred dollars from the user's checking account and dispensing five hundred dollars in physical cash notes to the user via the ATM 120.

Examples of Computing Environments for Implementing Certain Embodiments

Figure 5:
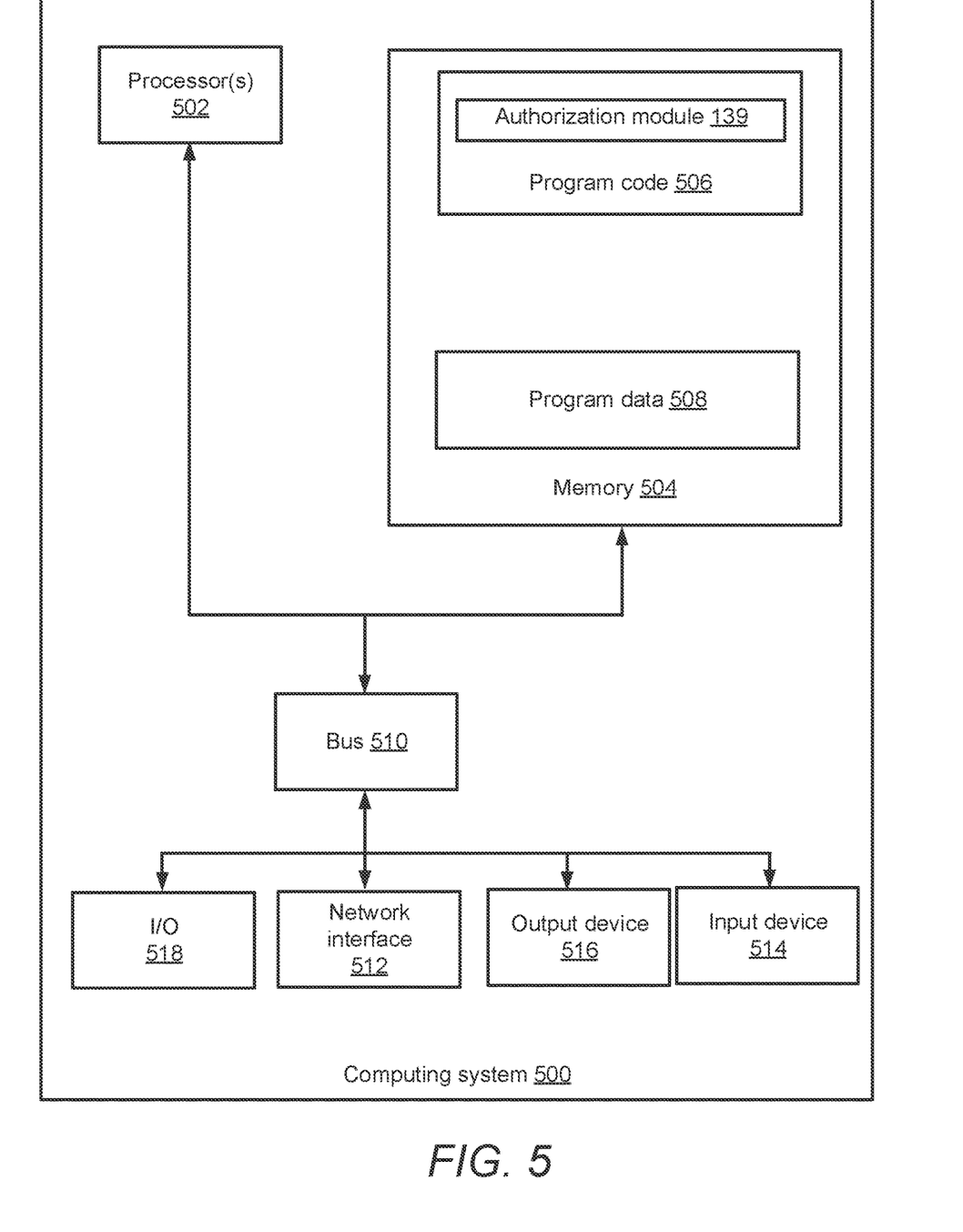
FIG. 5 depicts an example of a computing system that performs certain operations described herein, according to certain embodiments described in the present disclosure.

Any suitable computer system or group of computer systems can be used for performing the operations described herein. For example, FIG. 5 depicts an example of a computer system 500. The depicted example of the computer system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing program code 506, program data 508, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory device 1104 can be volatile memory, non-volatile memory, or a combination thereof.

The computer system 500 executes program code 506 that configures the processor 502 to perform one or more of the operations described herein. Examples of the program code 506 include, in various embodiments, the authorization module 139 of FIG. 1, which may include any other suitable systems or subsystems that perform one or more operations described herein (e.g., one or more neural networks, encoders, attention propagation subsystem and segmentation subsystem). The program code 506 may be resident in the memory device 504 or any suitable computer-readable medium and may be executed by the processor 502 or any other suitable processor.

The processor 502 is an integrated circuit device that can execute the program code 506. The program code 506 can be for executing an operating system, an application system or subsystem, or both. When executed by the processor 502, the instructions cause the processor 502 to perform operations of the program code 506. When being executed by the processor 502, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 504 store the program data 508 that includes one or more datasets described herein. In some embodiments, one or more of data sets are stored in the same memory device (e.g., one of the memory devices 504). In additional or alternative embodiments, one or more of the programs, data sets, models, and functions described herein are stored in different memory devices 504 accessible via a data network. One or more buses 510 are also included in the computer system 500. The buses 510 communicatively couple one or more components of a respective one of the computer system 500.

In some embodiments, the computer system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computer system 500 is able to communicate with one or more other computing devices via a data network using the network interface device 512.

The computer system 500 may also include a number of external or internal devices, an input device 514, a presentation device 516, or other input or output devices. For example, the computer system 500 is shown with one or more input/output ("I/O") interfaces 518. An I/O interface 518 can receive input from input devices or provide output to output devices. An input device 514 can include any device or group of devices suitable for receiving visual, auditory, or other suitable input that controls or affects the operations of the processor 502. Non-limiting examples of the input device 514 include a touchscreen, a mouse, a keyboard, a microphone, a separate mobile computing device, etc. A presentation device 516 can include any device or group of devices suitable for providing visual, auditory, or other suitable sensory output. Non-limiting examples of the presentation device 516 include a touchscreen, a monitor, a speaker, a separate mobile computing device, etc.

Although FIG. 5 depicts the input device 514 and the presentation device 516 as being local to the computer system 500, other implementations are possible. For instance, in some embodiments, one or more of the input device 514 and the presentation device 516 can include a remote client-computing device that communicates with computing system 500 via the network interface device 512 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method for conducting a contactless transaction with an automated teller machine ("ATM") in which the ATM performs operations comprising:

receiving, by an authorization module of the ATM, a unique transaction identifier ("UTN") from a user computing device via a first wireless communication session, wherein the user computing device is associated with a customer of a bank, and wherein the authorization module and the user computing device exchange one or more cryptographic keys to establish the first wireless communication session;

transmitting the UTN to a bank computing system corresponding to the bank;

receiving, from the bank computing system responsive to transmitting the UTN, transaction details and a first security code associated with the UTN, wherein the first security code is retrieved from a data storage unit of the bank computing system, wherein the data storage unit is configured to store encrypted information and is configured to generate the first security code using a random number generator;

receiving, by the authorization module of the ATM, a second security code from the user computing device via a second wireless communication session, wherein the security code is retrieved from a data storage unit of the user computing device configured to store encrypted information and configured to generate the second security code using a random number generator, and wherein the authorization module and the user computing device exchange one or more cryptographic keys to establish the second wireless communication session;

analyzing, by the authorization module of the ATM, the first security code and the second security code to determine if the first security code matches the second security code; and responsive to determining that the first security code matches the second security code, processing, by a transaction processing module of the ATM, the contactless transaction in accordance with the transaction details.

2. The computer-implemented method of claim 1, wherein, at a time before receiving the UTN from the user computing device, the ATM operates in a sleep mode or other power saving mode, the operations further comprising:

detecting a voice command via a microphone component of the ATM; and responsive to detecting the voice command, causing the ATM to exit the sleep mode or other power saving mode.

3. The computer-implemented method of claim 2, wherein the operations further comprise:

displaying, via a user interface, a request for a first tap of the user computing device; and establishing the first wireless communication session, wherein the first wireless communication session is established responsive to detecting the first tap of the user computing device, wherein detecting the first tap comprises detecting that the user computing device is within a proximity of a reader device.

4. The computer-implemented method of claim 3, the operations further comprising:

displaying, via a user interface, a request for a second tap of the user computing device; and establishing the second wireless communication session, wherein the second wireless communication session is established responsive to detecting the second tap of the user computing device, wherein detecting the second tap comprises detecting that the user computing device is within the proximity of the reader device.

5. The computer-implemented method of claim 1, wherein the first wireless communication session comprises a first near-field communication ("NFC") session and wherein the second wireless communication session comprises a second NFC session.

6. The computer-implemented method of claim 1, wherein the transaction comprises a cash withdrawal, wherein the transaction details specify an amount of cash, and wherein processing the transaction comprises dispensing the amount of cash specified in the transaction details.

7. The computer-implemented method of claim 1, wherein the user computing device receives the second security code via one or more inputs to the user computing device.

8. An automated teller machine ("ATM") system for conducting a contactless transaction, the system comprising:

processing hardware; and a non-transitory computer-readable medium communicatively coupled to the processing hardware, wherein the non-transitory computer-readable medium comprises computer-readable program instructions that, when executed by the processing hardware, cause the system to:

receive, by an authorization module of the ATM, a unique transaction identifier ("UTN") from a user computing device via a first wireless communication session, wherein the user computing device is associated with a customer of a bank, and wherein the authorization module and the user computing device exchange one or more cryptographic keys to establish the first wireless communication session;

transmit the UTN to a bank computing system corresponding to the bank;

receive, from the bank computing system responsive to transmitting the UTN, transaction details and a first security code associated with the UTN, wherein the first security code is retrieved from a data storage unit of the bank computing system, wherein the data storage unit is configured to store encrypted information and is configured to generate the first security code using a random number generator;

receive, by the authorization module of the ATM, a second security code from the user computing device via a second wireless communication session, wherein the security code is retrieved from a data storage unit of the user computing device configured to store encrypted information and configured to generate the second security code using a random number generator, and wherein the authorization module and the user computing device exchange one or more cryptographic keys to establish the second wireless communication session;

analyze, by the authorization module of the ATM, the first security code and the second security code to determine if the first security code matches the second security code; and responsive to determining that the first security code matches the second security code, process, by a transaction processing module of the ATM, the contactless transaction in accordance with the transaction details.

9. The system of claim 8, wherein, at a time before receiving the UTN from the user computing device, the ATM operates in a sleep mode or other power saving mode, wherein the ATM system further comprises a microphone component, wherein the non-transitory computer-readable medium further comprises computer-readable program instructions that, when executed by the processing hardware, cause the system to:

detect a voice command via the microphone component; and     responsive to detecting the voice command, cause the ATM system to exit the sleep mode or other power saving mode.

10. The system of claim 8, further comprising a reader device, wherein the non-transitory computer-readable medium further comprises computer-readable program instructions that, when executed by the processing hardware, cause the ATM system to:

display, via a user interface, a request for a first tap of the user computing device; and     establish the first wireless communication session, wherein the first wireless communication session is established responsive to detecting the tap of the user computing device, wherein detecting the tap comprises detecting that the user computing device is within a proximity of a reader device.

11. The system of claim 10, further comprising a reader device, wherein the non-transitory computer-readable medium further comprises computer-readable program instructions that, when executed by the processing hardware, cause the ATM system to:

display, via a user interface, a request for a second tap of the user computing device; and     establish the second wireless communication session, wherein the second wireless communication session is established responsive to detecting the second tap of the user computing device, wherein detecting the second tap comprises detecting that the user computing device is within the proximity of the reader device.

12. The system of claim 8, wherein the first wireless communication session comprises a first near-field communication ("NFC") session and wherein the second wireless communication session comprises a second NFC session.

13. The system of claim 8, wherein the transaction comprises a cash withdrawal, wherein the transaction details specify an amount of cash, and wherein processing the transaction comprises dispensing the amount of cash specified in the transaction details.

14. The system of claim 8, wherein the user computing device receives the second security code via one or more inputs to the user computing device.

\* \* \* \* \*